Figure 3:
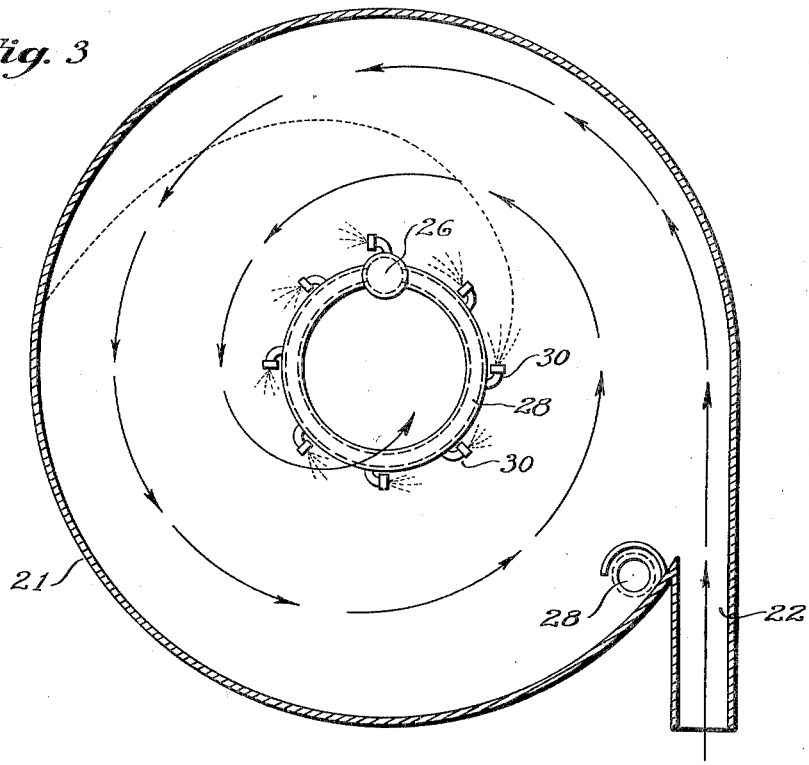

March 25, 1941.   R. V. KLEINSCHMIDT   2,235,998
APPARATUS FOR PRODUCING AN INTIMATE CONTACT BETWEEN A LIQUID AND A GAS
Filed July 15, 1939   3 Sheets-Sheet 1
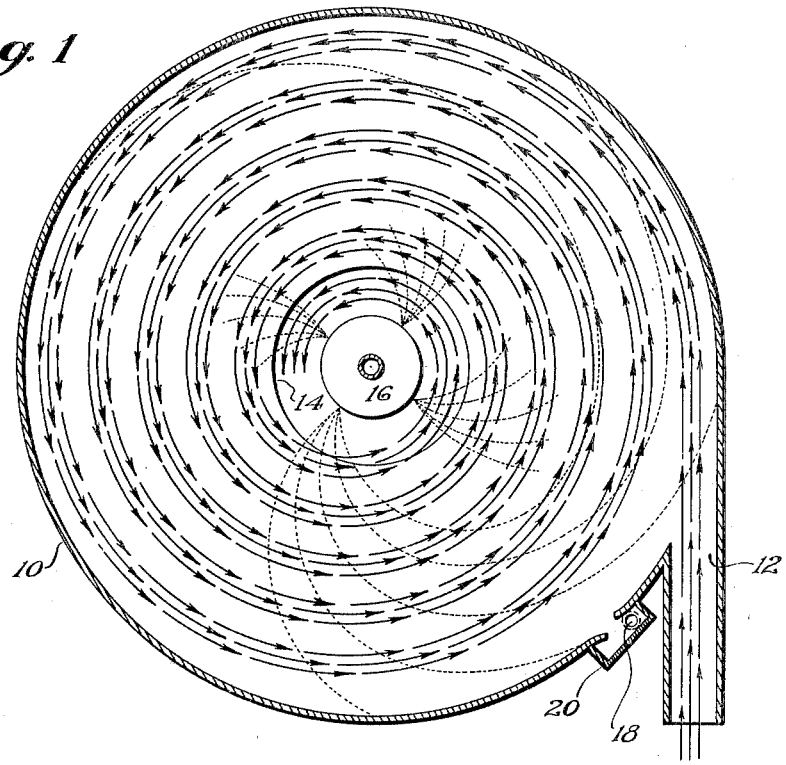
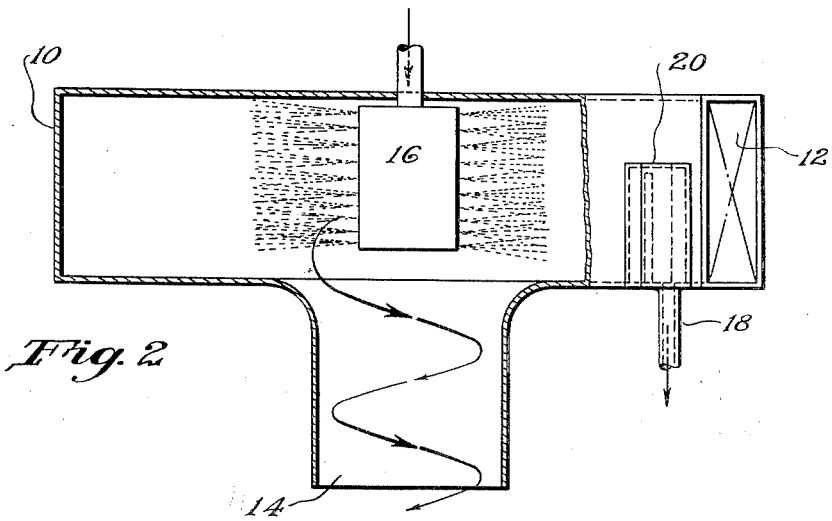

March 25, 1941.  R. V. KLEINSCHMIDT  2,235,998

APPARATUS FOR PRODUCING AN INTIMATE CONTACT BETWEEN A LIQUID AND A GAS

Filed July 15, 1939  3 Sheets-Sheet 3

Witness
Paul F. Bryant

Inventor
Robert V. Kleinschmidt
by his attorneys

Patented Mar. 25, 1941

2,235,998

UNITED STATES PATENT OFFICE 2,235,998

APPARATUS FOR PRODUCING AN INTIMATE CONTACT BETWEEN A LIQUID AND A GAS

Robert V. Kleinschmidt, Stoneham, Mass., assignor to Pease, Anthony Equipment Company, Cambridge, Mass., a corporation of Massachusetts Application July 15, 1939, Serial No. 284,717

1 Claim. (Cl. 261—79)

The present invention relates to an apparatus for producing an intimate contact between a liquid and gas in the general manner disclosed in United States Letters Patent granted to F. F. Pease, No. 1,992,762, dated February 26, 1935.

In its broader aspects the invention is concerned with the promotion of an intimate contact between gases and liquids and subsequent separation for the general purpose of bringing about chemical or physical interaction. General examples of such processes are indicated by absorption of soluble gases such as ammonia or sulphur dioxide from mixtures containing more or less of other insoluble or less soluble gases, the condensation of vapors by spraying with cold liquid, the saturation of gases with vapors of a liquid, and the cooling of gases by direct contact with a cold liquid such as brine or water. In the more important of these cases there is reached a state of chemical or thermal equilibrium which it may be desired to attain as completely as possible.

The method disclosed in the Pease patent above referred to is concerned with the washing of gases, and provides an intimate liquid-gas contact which has proved efficacious and commercially valuable in those cases where no equilibrium conditions are involved, and where counter-current action may well be unnecessary, as for example in the removal of dust from gases and the absorption of acid gases in strongly alkaline fluids wherein the reaction of the gases with the alkali goes rapidly to completion without tendency to build up any vapor pressure of acid gas in the liquid as absorption proceeds.

In those processes where a state of chemical or thermal equilibrium is to be attained it is very desirable to bring about the well-known conditions of counter-current action of a type which is now attained through the employment of packed towers or bubble towers in the case of chemical reactions and rectification and absorption, and by cooling towers containing trays, baffles or wooden slats in the case of heat transfer and cooling.

According to the present invention counter-current action is secured in an apparatus of the type generally disclosed in the Pease patent and in a manner to produce a highly efficient and economical process. In this patent, as will be obvious to those skilled in the art, the washing or absorbent liquid is introduced as a fine spray in or adjacent to the axis of a rotating cylindrical body or mass of gas, and is thrown outwardly by centrifugal force to traverse the gas body which at the same time is moving axially or lengthwise of the washing chamber. In this manner each drop of liquid contacts during its entire path gas which has already been subjected to substantially the same amount of contact with other liquid, creating what may be called a cross-current contact.

According to the present process, the liquid may be introduced in or adjacent to the axis of the rotating cylinder of gas, and thence traverses the body of gas outwardly as previously described. The present invention, however, contemplates the essential difference that the gas, instead of spiraling from the inlet to the outlet adjacent the outer periphery of the chamber, moves radially inward in a true spiral from a tangential or circumferential intake to one or more centrally disposed outlets. This change from what may be described as a generally axial flow to what is essentially a radial inward flow of the gas creates a true counter-current effect which not only permits simplicity of structural design, but greatly enhances the efficiency of the action. Since the centrifugal forces on the liquid particles act radially outward, and the general direction of the flow of gas is radially inward, the counter-current action must of necessity take place. The rotation of the gas does not materially affect this action since the spray particles are so fine that they rapidly assume the same general rotation as the gases, nevertheless spiraling outwardly under the action of centrifugal forces. In this type of process it is possible to gain all the advantages of fine atomization of the entering liquid with resulting intimate contact with the gas, and at the same time to have the advantage of continuous counter-current flow of the liquid and gas in contact, a condition which has hitherto not been realized in practice, and which is of the greatest practical value in many chemical and thermal processes.

The advantages of the invention are likewise marked in the removal of dust from gases and other analogous applications in which the counter-current feature has not previously been considered as necessary. This will be obvious from a consideration of the fact that as the gas spirals inwardly it furnishes a relatively longer path of contact of the liquid particles through the gas than is the case with preceding methods such as that disclosed in the Pease patent.

Structurally the concept of the invention as above described may be attained with certain modifications from the structure actually shown, provided, however, that the axial length of the treating chamber is sufficiently short with respect to its diameter to initiate and compel an inward radial movement of the traversing gas as it generally spirals from the peripheral intake to the centrally disposed outlet. In the type of apparatus disclosed in the Pease and other patents, the necessary radial inward movement of the gas is not attained due essentially to the axial length of the apparatus with respect to its diameter, the general movement of the gas body being lengthwise of the chamber and whirling about the outer periphery, the centrally disposed outlet merely causing the gas at the upper or outlet end of the chamber to be discharged through the outlet after treatment and without setting up any substantial inward current in the main body of the gas under treatment.

Figure 4:
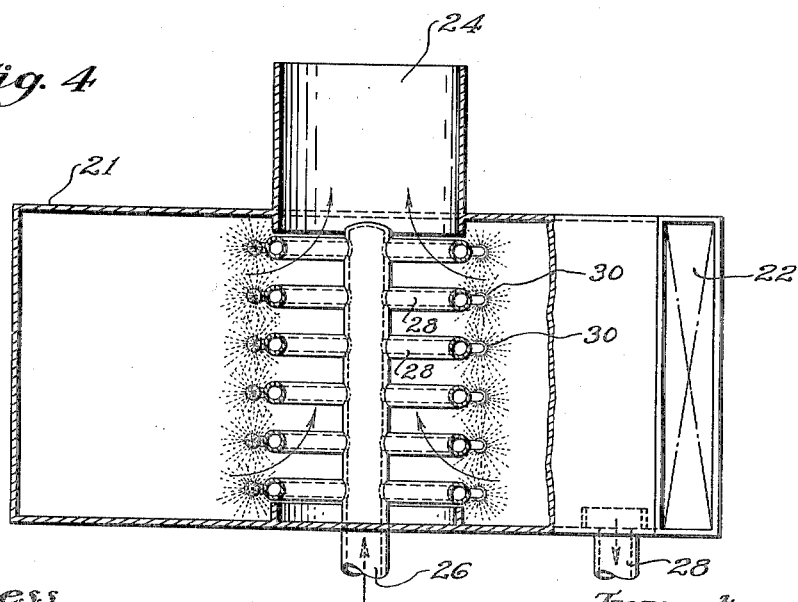

In the accompanying drawings illustrating the preferred form of the invention, Figs. 1 and 2 represent sections in plan and elevation, respectively, of a typical apparatus for producing a counter-current action of liquid and gas; Figs. 3 and 4 illustrate similar plan and elevational views of a slightly modified form of apparatus; and Figs. 5 and 6 are again similar plan and elevational views of a further modification.

In the embodiment of the invention illustrated in Figs. 1 and 2, the treatment chamber is generally cylindrical and is produced by a casing 10 having a generally tangential gas intake 12 extending throughout the height or axial length of the chamber, and a centrally disposed outlet 14. The diameter of the cylindrical chamber is considerably greater than the axial length, and the liquid of whatever nature is introduced centrally by a spray head or member indicated generally at 16, which may be of the form shown in the Pease patent or of a type intended to produce a finely divided atomized spray column directed outwardly by centrifugal force. The drainage is removed through a drainage outlet 18 extending from the floor of the chamber and housed within a compartment 20 outside of the peripheral wall of the chamber, as indicated more particularly in Fig. 1. It will be noted that with this construction there is no axial movement of the gas, the entire movement being a sweeping of the gas in a series of contracting spirals until it emerges outwardly through the outlet 14. In other words, the path of travel of the gas remains approximately in the same plane lengthwise of the chamber, but sweeps from the inlet to the outlet in a series of diminishing spirals as shown in Fig. 1, the gas thus progressing counter to the direction of the washing liquid.

In the structure shown in Figs. 3 and 4, the method is essentially the same, the cylindrical chamber being provided by a casing 21 of generally cylindrical form, having a tangential inlet 22 extending throughout the length or height of the chamber, and a centrally disposed outlet 24. Liquid may be introduced through a centrally located liquid duct 26, having a series of conducting rings 28 on which are mounted spray heads 30 which direct a multiplicity of sprays forming a spray column in the general direction of spiraling movement of the gas to inject the liquid substantially centrally and outwardly of the gas body. Drainage is collected through the outlet duct 28 located in the floor of the chamber adjacent the tangential intake.

Figure 5:
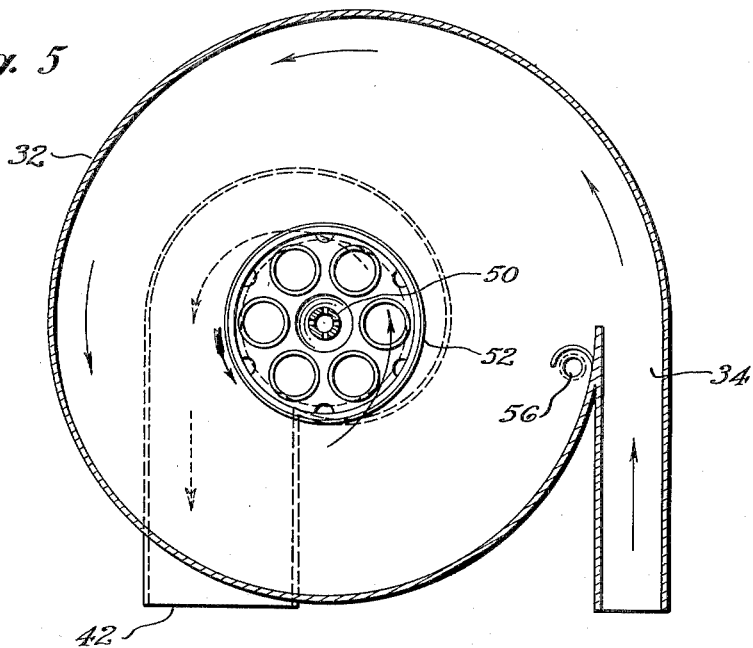
Figure 6:
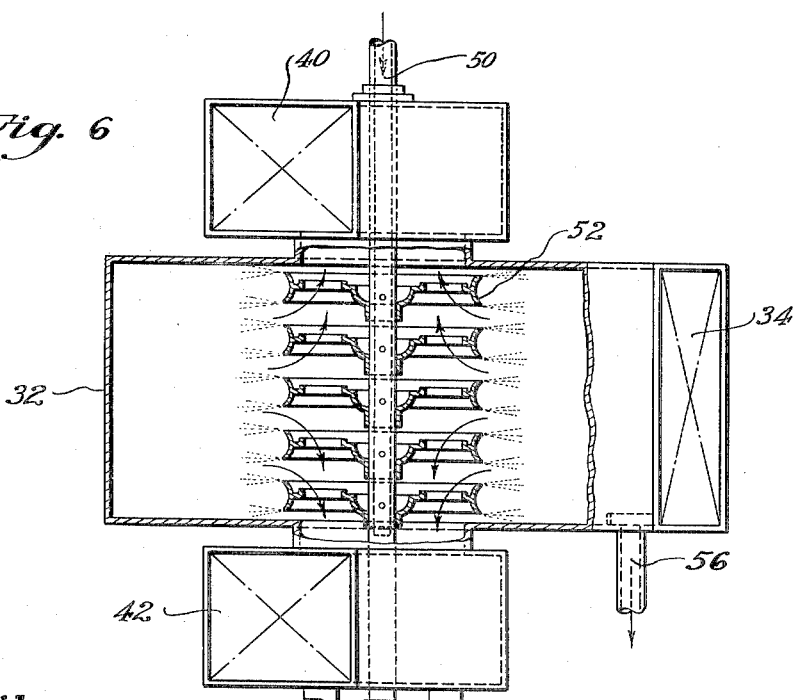

In the structure shown in Figs. 5 and 6, the cylindrical chamber is provided by a casing 32, having a tangential intake 34 extending throughout the complete height of the chamber, and provided with two centrally disposed outlets 40 and 42, having generally a scroll form into which the rotating gas body is delivered. The liquid is again delivered centrally of the gas body through a hollow pipe 50, which carries a series of circular spray disks 52 revolving at high speed and discharging from the peripheral edges a series of centrally and outwardly directed sprays of atomized liquid. The spray heads may be conveniently operated by a motor 54 directly connected thereto. Drainage again is removed through the pipe 56 located in the bottom of the treating chamber adjacent the intake.

It will be noted that in all of these constructions movement of the gas body after introduction to the chamber is in the direction of a series of diminishing spirals in the same plane, as contrasted with an axial movement of the body lengthwise of the chamber. In every case the liquid is delivered approximately centrally into the gas body, traveling outwardly thereacross to produce a true counter-current action. In the structure shown in Figs. 5 and 6 outlets are located at opposite ends of the treating chamber to promote and facilitate the discharge of the gas therefrom, such an arrangement facilitating the handling of gas in a chamber of greater length than a chamber such as shown in Figs. 1 and 2 provided with a single outlet.

What is claimed is:

Liquid and gas contact apparatus, comprising a casing providing a generally cylindrical treating chamber, a tangential gas inlet slot extending throughout the length of the chamber, and a liquid spray device located centrally of the chamber and designed to produce an outwardly radiating liquid spray column extending throughout substantially the length of the chamber to contact gas admitted to the said treating chamber throughout the length of said inlet slot.

ROBERT V. KLEINSCHMIDT.